April 20, 1965   C. KULWIEC   3,179,845
HEADLIGHT ILLUMINATION AND SIGNALING
SYSTEM FOR MOTOR VEHICLES
Filed May 1, 1961   8 Sheets-Sheet 1

FIG. IA.

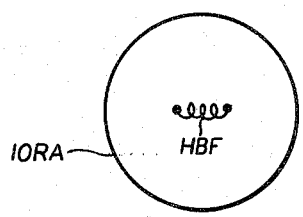
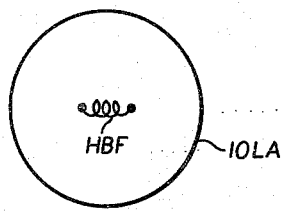

PRESENT RIGHT HIGH BEAM LAMP       PRESENT LEFT HIGH BEAM LAMP

FIG. IB.

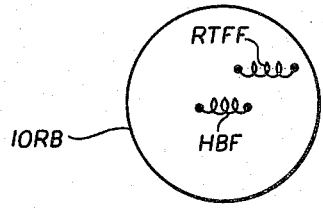
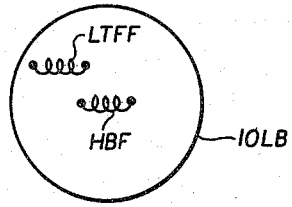

RIGHT HIGH BEAM LAMP WITH          LEFT HIGH BEAM LAMP WITH
RIGHT FOLLOWING FILAMENT           LEFT FOLLOWING FILAMENT
SHORT TURNING RADIUS               SHORT TURNING RADIUS

FIG. IC.

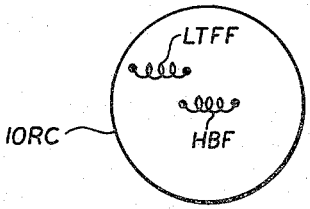
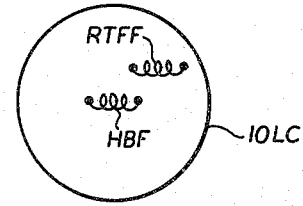

RIGHT HIGH BEAM LAMP WITH          LEFT HIGH BEAM LAMP WITH
LEFT FOLLOWING FILAMENT            RIGHT FOLLOWING FILAMENT
LONG TURNING RADIUS                LONG TURNING RADIUS

FIG. ID.

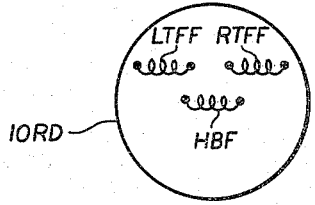
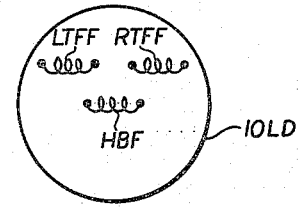

RIGHT HIGH BEAM LAMP WITH          LEFT HIGH BEAM LAMP WITH LEFT
LEFT AND RIGHT FOLLOWING           AND RIGHT FOLLOWING FILAMENTS,
FILAMENTS, LONG OR SHORT           LONG OR SHORT TURNING RADIUS
TURNING RADIUS

INVENTOR
CHESTER KULWIEC
BY
ATTORNEY.

April 20, 1965 C. KULWIEC 3,179,845
HEADLIGHT ILLUMINATION AND SIGNALING
SYSTEM FOR MOTOR VEHICLES
Filed May 1, 1961 8 Sheets-Sheet 2

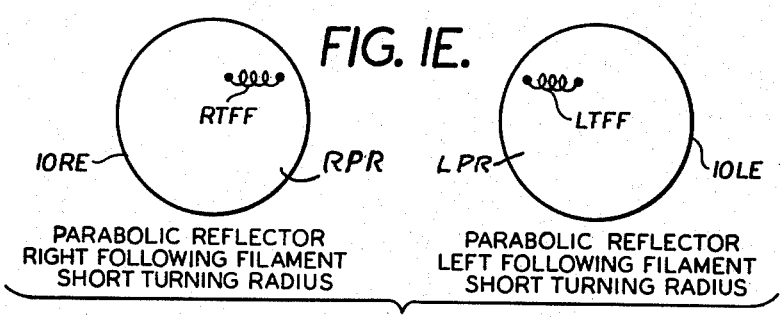

PARABOLIC REFLECTOR RIGHT FOLLOWING FILAMENT SHORT TURNING RADIUS

PARABOLIC REFLECTOR LEFT FOLLOWING FILAMENT SHORT TURNING RADIUS

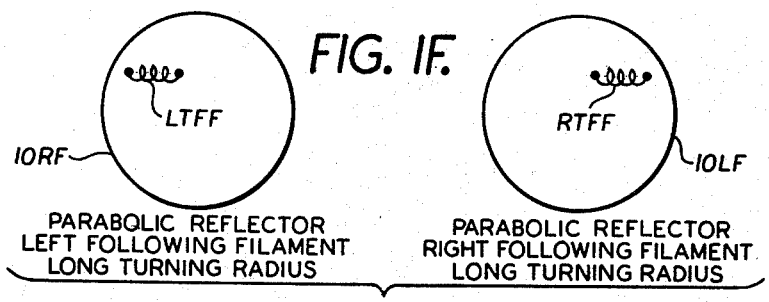

PARABOLIC REFLECTOR LEFT FOLLOWING FILAMENT LONG TURNING RADIUS

PARABOLIC REFLECTOR RIGHT FOLLOWING FILAMENT LONG TURNING RADIUS

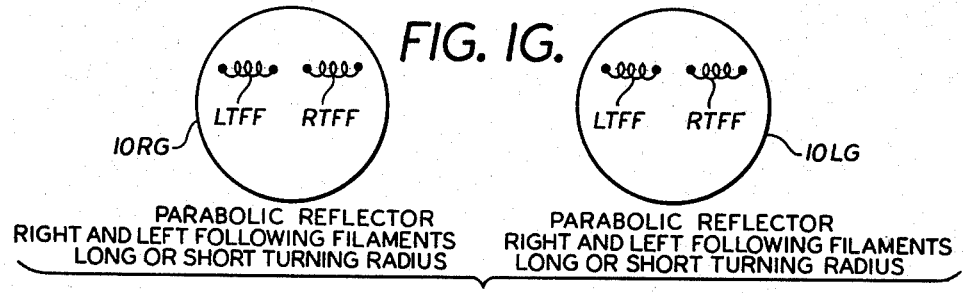

PARABOLIC REFLECTOR RIGHT AND LEFT FOLLOWING FILAMENTS LONG OR SHORT TURNING RADIUS

PARABOLIC REFLECTOR RIGHT AND LEFT FOLLOWING FILAMENTS LONG OR SHORT TURNING RADIUS

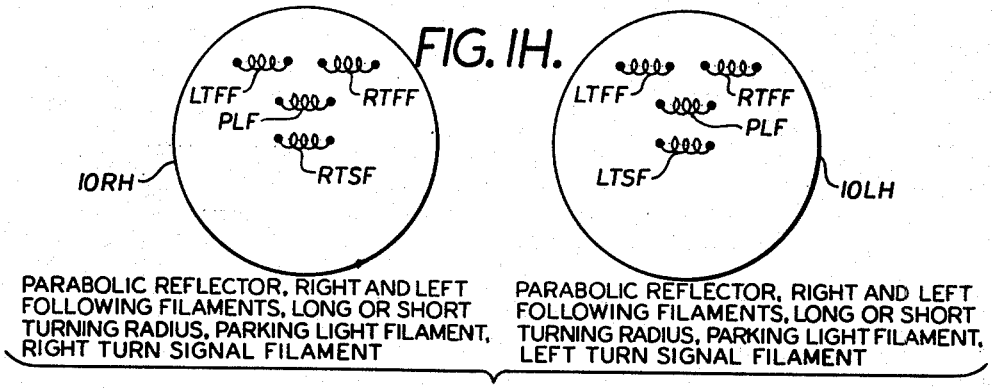

PARABOLIC REFLECTOR, RIGHT AND LEFT FOLLOWING FILAMENTS, LONG OR SHORT TURNING RADIUS, PARKING LIGHT FILAMENT, RIGHT TURN SIGNAL FILAMENT

PARABOLIC REFLECTOR, RIGHT AND LEFT FOLLOWING FILAMENTS, LONG OR SHORT TURNING RADIUS, PARKING LIGHT FILAMENT, LEFT TURN SIGNAL FILAMENT

INVENTOR
CHESTER KULWIEC
BY
ATTORNEY.

April 20, 1965 C. KULWIEC 3,179,845
HEADLIGHT ILLUMINATION AND SIGNALING
SYSTEM FOR MOTOR VEHICLES
Filed May 1, 1961 8 Sheets-Sheet 3

INVENTOR
CHESTER KULWIEC
BY
ATTORNEY.

April 20, 1965 C. KULWIEC 3,179,845
HEADLIGHT ILLUMINATION AND SIGNALING
SYSTEM FOR MOTOR VEHICLES
Filed May 1, 1961 8 Sheets-Sheet 4
FIG. 3.
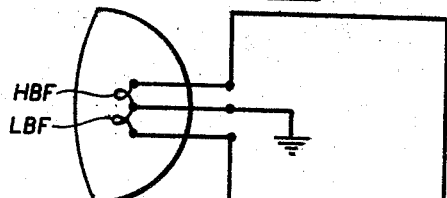
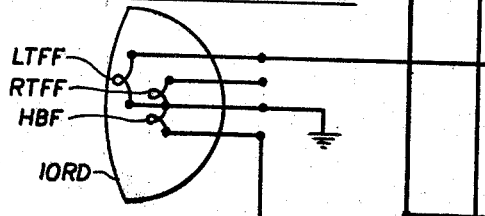
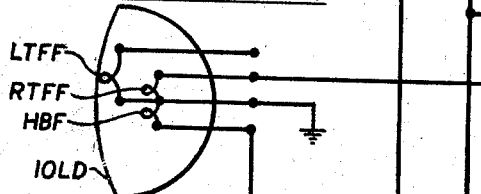
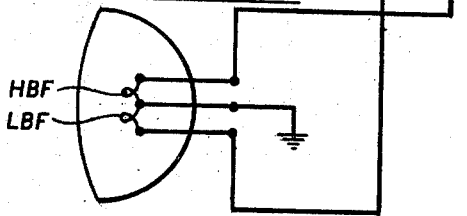
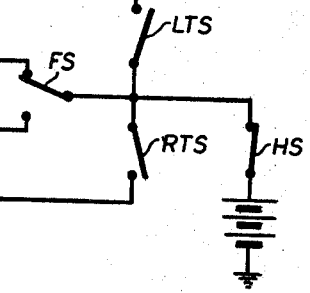
INVENTOR
CHESTER KULWIEC
BY
ATTORNEY.

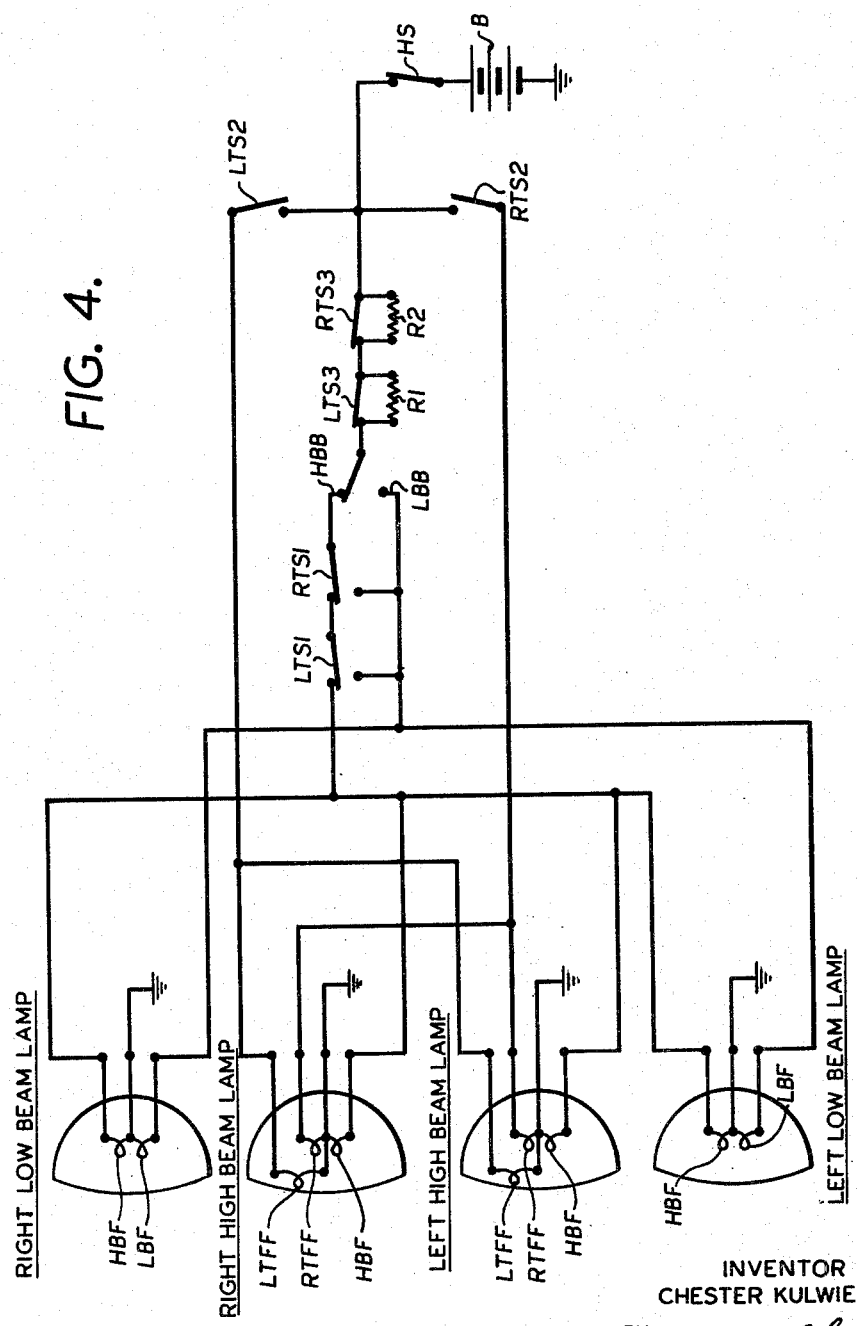

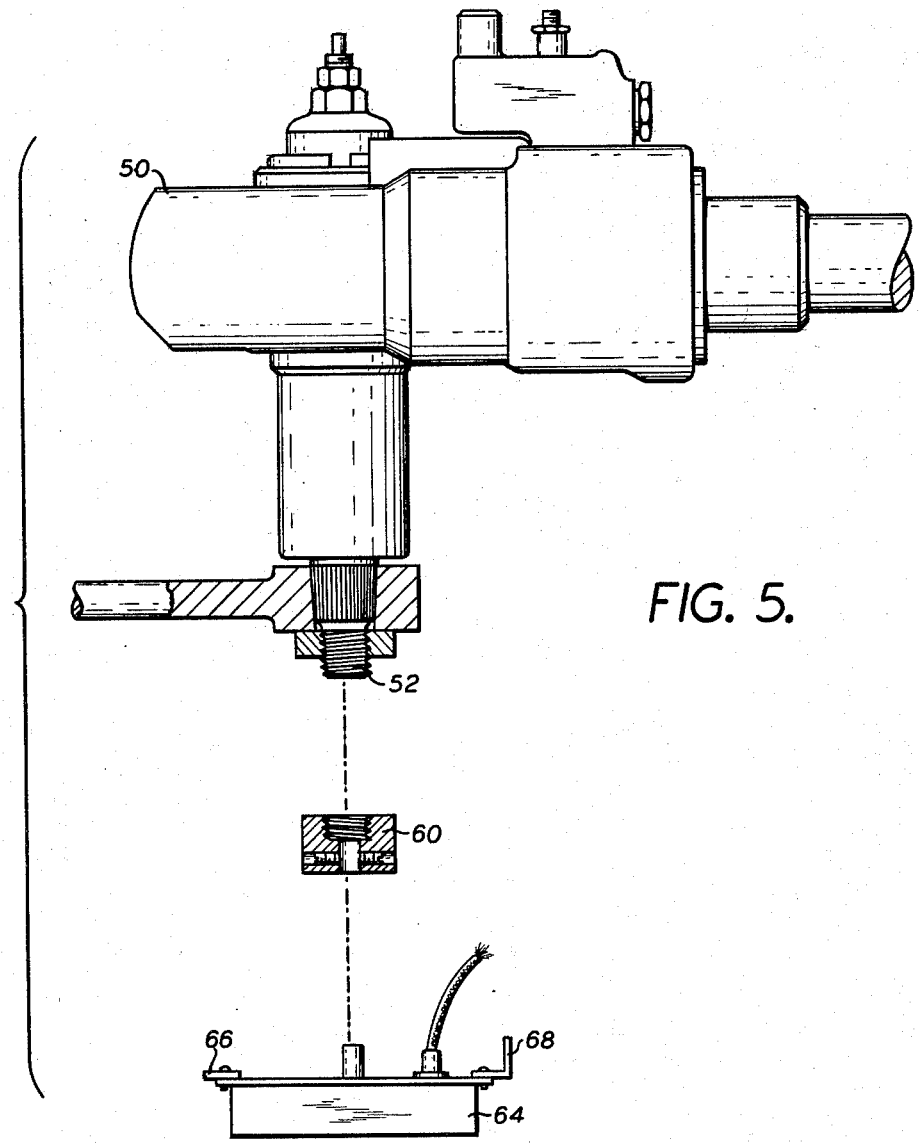

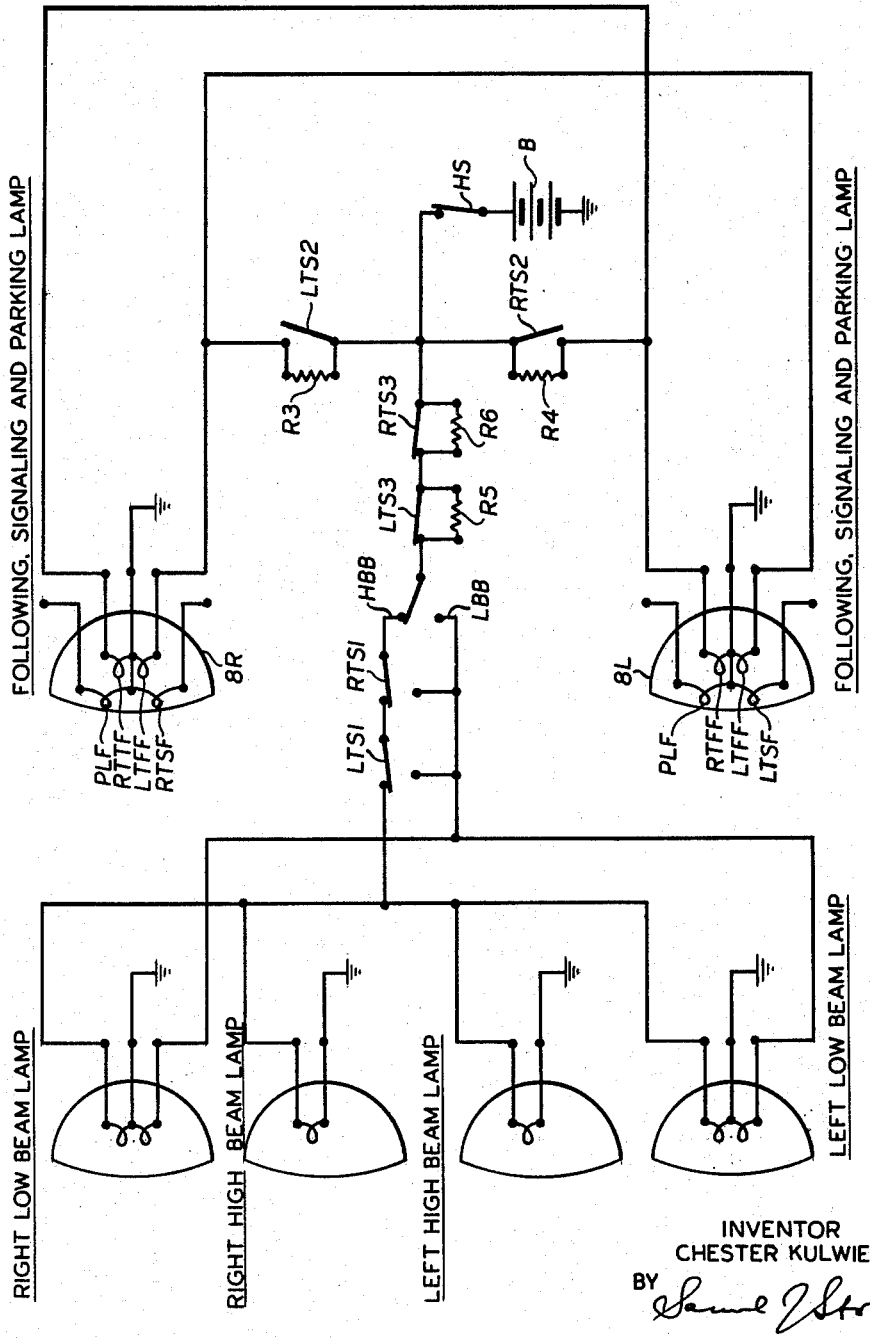

though momentary,
3,179,845
HEADLIGHT ILLUMINATION AND SIGNALING SYSTEM FOR MOTOR VEHICLES
Chester Kulwiec, 84—19 150th St., Jamaica, N.Y.
Filed May 1, 1961, Ser. No. 125,292
1 Claim. (Cl. 315—83)

This invention relates to a headlight illumination and signaling system for motor vehicles, and more particularly to a system for providing all necessary illumination for driving and parking conditions as well as directional signaling. More specifically, the invention relates to the problems of adequate illumination for driving in both straight and curved paths, the problem of illumination dipping, dimming, or extinguishing relative to oncoming traffic, the attendant problems of directional signal illumination, and finally adequate parking illumination.

The automobile headlight system in general use today consists of four headlamps, namely, two low beam and two high beam lamps. Also utilized in one form or another are parking and directional signal lamps. When in use on the low beam, the filaments of the two low beam lamps are energized. When in use on the high beam, the filaments of the two high beam lamps are energized, plus secondary filaments in the low beam lamps. Selection of the desired lamps and filaments is made by a single-pole, double-throw switch, actuated either pedally or by a photoelectric control mechanism energized by the headlights of oncoming cars.

Despite the efficiency of the four headlamp system, which came into general use in 1957-1958, there are areas where improvement can be made, particularly when the vehicle deviates from a straight path, as when turning a corner or rounding a curve. The illumination problems encountered on turns or curves vary with the speed of the vehicle. At such times because of the conventional manner of mounting the lamps and the general use of front wheel steering, the light projected from the lamps does not illuminate the actual path traversed by the vehicle, but rather follows a path tangent to the turning circle.

This effect is most pronounced when rounding a right-angle corner at relatively low speeds. At such times there is a definite lack of illumination on the desired path, plus a considerable amount of unnecessary illumination of objects located off the highway, all of which is a distraction to the driver and a detriment to safety. In addition, the sweeping of this surplus illumination around the area of a turn causes a dangerous, though momentary, glare affecting the drivers of vehicles in other traffic lanes in the vicinity.

The same condition exists, to a lesser degree, at higher speeds on turns of larger radius, and the driver often finds it desirable to use a lower and broader beam of illumination at such times. This can be done at present by operating the foot switch to the low beam position. Many drivers do not do this, however, and create unnecessary glare hazardous to drivers in lanes of opposing traffic. In a gentle right-hand curve, for example, a careless driver using the high beam may project momentarily blinding illumination into the eyes of oncoming drivers. Automatic dipping of the high beam in a gentle curve would obviate this problem.

The present invention has three initial objects, intended to improve the present headlight system without radical alteration: The first object is the automatic dipping of the high beam on a gentle curve. The second is the automatic furnishing of additional illumination on a sharp curve or turn. The third is the automatic dimming or extinguishing of unnecessary or undesirable illumination on a sharp curve or turn.

Since it is realized that progress is an evolutionary process, the invention provides a series of increasingly complex systems of headlighting capable of being integrated into the existing system at minimum expenditure. This is accomplished by utilizing to the maximum those components already in general use and making reasonable modifications to other components, and by adding such new components as are essential to obtaining the desired results.

To obtain such desired results, some modifications must be made to the present headlamps. The present high beam lamp, having within it only one centrally located filament, affords working space for the addition of others, and has the further advantage of a prismatic frontal lens having a relatively uniform dispersion pattern. To obtain a lamp suitable for illuminating curves or turns, an additional filament, offset from the present high beam filament, may be placed within the high beam lamp. It would be necessary to provide one such additional filament for a left turn, and another for a right turn. One headlamp would have one such additional filament, and the other headlamp the other.

It is known, however, that different makes and styles of vehicles have different turning radii. In the 1960 U.S.A. models, for example, the turning radii varied from approximately 39 to approximately 48 feet. Since the position of the following beam filament is fixed by that of the primary function high beam filament, which in turn is adjusted to certain legal standards, it would seem necessary to manufacture several types of following headlamps to accommodate vehicles of different turning radii. Since this would be economically unsound, a simpler solution is to physically, but not electrically, transpose the following beam headlamps from the left side to the right side, or vice versa as each individual case may require.

The foregoing may, however, encounter economic objections. The manufacturing and other costs of separate headlamps having oppositely disposed following beam filaments for right and left-hand installation might be considered excessive. To surmount this difficulty, it may be found desirable to install two following beam filaments in each headlamp but to use only one. In the present state of the lamp art, one following beam lamp per side is considered adequate to illuminate the turn.

Such lamp construction thus has the economic advantage of sufficing for all applications. It has at this stage, however, the disadvantage of one unused filament in each lamp, but since the cost of this filament comprises only a small part of the total, such disadvantage would be far outweighed by the universality of application of this type of construction. Moreover, such unused filaments will be found to be useful in connection with the dimming or extinguishing of the main driving beams in more advanced headlighting systems.

In addition to the problem of an adequate following beam is the problem of automatic dipping of the high to the low beam on curves and turns. As will shortly become apparent, the present invention provides for automatic dipping to the low beam when the steering wheels of the vehicle are deviated approximately 25% either to the left or right from their straight-ahead position. A further deviation to about the 50% position energizes the following beam filaments. Further deviation to about the 60% position will dim or completely extinguish all driving beams, leaving only the following beams to illuminate the path. The 10% differential between the last mentioned positions is intended to avoid an abrupt and disconcerting transition in the quantity of illumination. As the wheels are straightened the process is reversed, and when the vehicle resumes its straight line course, the normal high or low beam, as previously selected by the driver, is again put in operation.

Thus the headlighting system last above described fully achieves the three objects of the invention as first above set forth, namely, automatic dipping of the high beam on a gentle curve, automatic furnishing of additional illumination on a sharp curve, and automatic dimming or extinguishing of unnecessary illumination on a sharp curve.

The previously described headlight system, while an improvement over the present art, is somewhat limited in efficiency, since it involves modifications which must be superimposed on a primary system without appreciably altering it. Thus, for example, the design of the prismatic ribbing of the frontal lenses is established by the requirements of the original units, and the following beams cannot be altered in direction without misaligning the original beam.

It is therefore the ultimate object of this invention to provide an advanced and efficient headlighting system of the character described, consisting of the following components:

(1) The conventional low beam lamp.
(2) The conventional high beam lamp.
(3) A lamp specially designed for following illumination.
(4) Additional components within the last mentioned lamp, such as directional signaling and parking elements.
(5) Additional components external to the last mentioned lamp, such as switch mechanisms and resistors, etc., that be necessary or desirable.

It will appear from the foregoing that what is herein proposed is a six lamp system, two of the lamps providing a low driving beam, two (in conjunction with the low beam lamps) providing a high driving beam, and two providing following beams as well as parking lights and directional signals.

The following beam headlamp is ideally adapted to receive and utilize the parking and directional signaling components. It is hardly novel to add a parking filament to a larger headlamp. But to add a directional signal filament to a larger headlamp is novel, inasmuch as this has heretofore been impracticable for the reason that the original function of the larger headlamp (driving illumination) would prevent the directional signal from being seen. However, a directional signal filament in a specialized following headlamp is most practical, inasmuch as the following filaments are not energized until the proposed turn is actually begun. The directional signal filament would be energized prior to the turn, and hence prior to energization of the following filament. In addition, there is no conflict between a directional signal light and the following beam, since the former is projected horizontally straight ahead, while the latter is deviated leftwardly or rightwardly, as well as downwardly to a considerable degree. Hence, although the ratio of intensity might be as high as 10 to 1 in favor of the following beam, the directional signal light would, nonetheless, remain at all times prominently visible to drivers of oncoming vehicles.

Thus, to the specialized following headlamp it is functionally practical and economically feasible to add directional signal and parking light filaments. These additional functions would somewhat defray the cost of a six lamp system, as well as prevent cluttering the vehicle with a superfluity of lamps, each performing but a single or at most, dual function. Also, such a specialized following headlamp would bring the constructional advantages of a sealed beam system to the parking and directional signal lights.

The invention is illustrated in the accompanying drawing, in which:

FIG. 1A is a schematic view of a typical pair of high beam headlamps as conventionally used in motor vehicles.

FIG. 1B is a similar view of a pair of such headlamps, but showing one additional filament in each headlamp designed to project a following beam and intended for use on vehicles having a relatively short turning radius.

FIG. 1C is a view similar to that of FIG. 1B, but showing the following filaments in reversed positions in order to adapt the headlamps for use on vehicles having a relatively long turning radius.

FIG. 1D is a view of a pair of headlamps as shown in FIG. 1A, but with the addition of two additional filaments in each headlamp, these additional filaments being adapted to project following beams for vehicles of either long or short turning radius.

FIG. 1E is a schematic view of a pair of headlamps containing following filaments only, the reflectors in said headlamps being of parabolic shape, and said headlamps being intended for installation in vehicles having a relatively short turning radius.

FIG. 1F is a view similar to that of FIG. 1E showing a pair of headlamps having a parabolic reflector and following filaments intended for use on vehicles with a relatively long turning radius.

FIG. 1G is a view of a pair of parabolic reflector headlamps, each of which contains two following filaments, said headlamps being adapted for use on vehicles of either long or short turning radius.

FIG. 1H is a schematic view of a pair of headlamps specifically intended for following, parking and directional signaling functions, each said headlamp containing a pair of following filaments, a parking filament, and a directional signaling filament.

FIG. 3 is another circuit diagram showing a headlight system for vehicles of relatively long turning radius, said system including conventional low beam headlamps and high beam and following headlamps, as disclosed in FIG. 1D.

FIG. 4 is another circuit diagram similar to that of FIG. 3 and embodying the same headlamp components, but showing a different switch system providing for automatic dipping of the high beams on a 25% turn and actuation of the following filaments on a 50% turn, as well as showing simultaneous energization of the following filaments on both sides of the car as a desirable preliminary to the dimming or extinguishing of the forward driving beams by switches LTS3 and RTS3 when the wheels are deviated about 60%.

Figure 2:
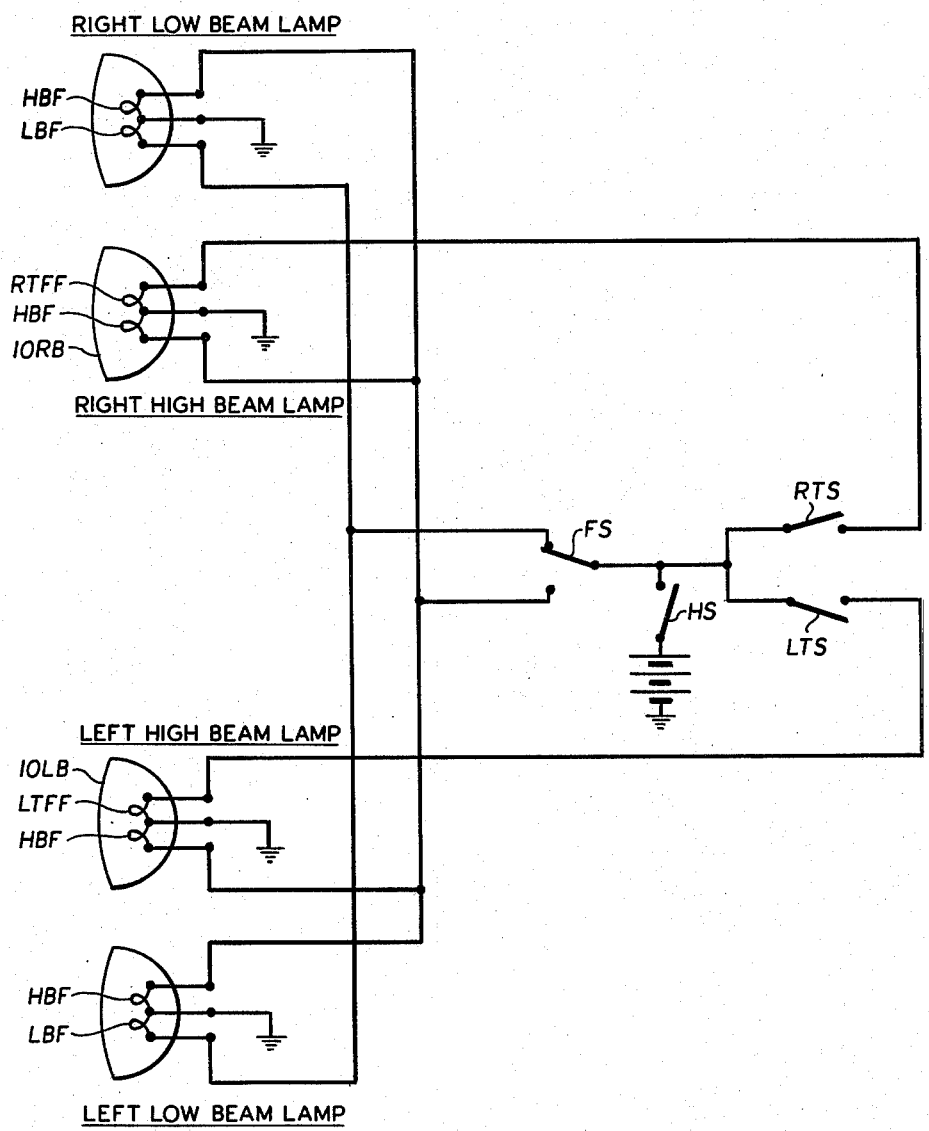
FIG. 2 is a circuit diagram showing the headlamps of FIG. 1B installed in a headlight system in conjunction with conventional low beam headlamps, said installation being intended for vehicles having a relatively short turning radius.

FIG. 5 is an exploded view partly in section showing the steering gear box of a typical motor vehicle and the means of connecting same to the switch mechanism shown in FIGS. 2, 3, and 4.

Figure 6A:
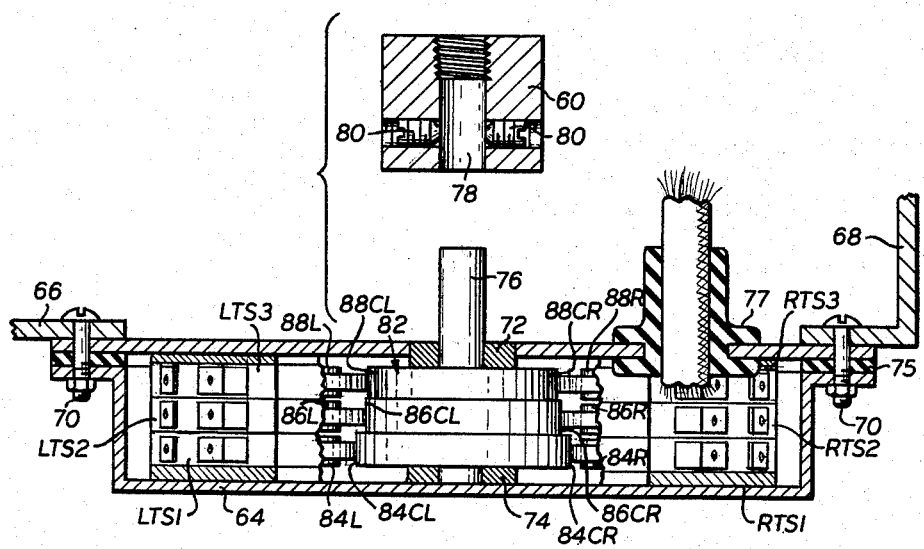

FIG. 6A is an exploded sectional view showing the switch mechanism and the means for connecting or coupling same to the steering gear cross-shaft.

Figure 6B:
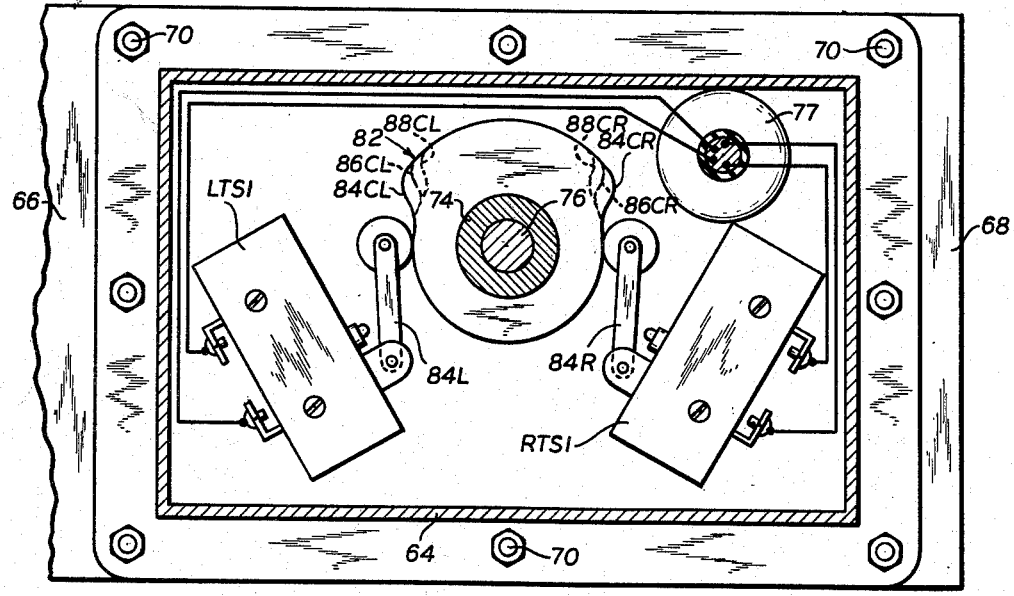

FIG. 6B is another sectional view through said switch mechanism.

FIG. 7 is a circuit diagram showing the present invention expressed in a six-headlamp system, two of said headlamps being conventional low beams, two being conventional high beams, and two being the specialized following, parking and signaling headlamps shown in FIG. 1H.

Referring now to the details of the invention as illustrated in the drawing, it will be seen in FIG. 1A that a pair of conventional high beam lamps 10RA and 10LA are provided with conventional high beam filaments HBF centrally situated within the reflectors. FIG. 1B shows the same pair of high beam headlamps, now designated 10RB and 10LB, with added filaments RTFF and LTFF respectively. These two filaments are offset upwardly and inwardly from the high beam filament HBF, and their function is to provide right and left turn following beams. It will be noted that the right following filament is situated in the right headlamp, while the left following filament is situated in the left headlamp. This arrangement is intended for use in motor vehicles having a relatively short turning radius.

Referring now to FIG. 1C, it will be seen that the same high beam headlamps, here designated 10RC and 10LC, are provided with following filaments LTFF and RTFF respectively, these filaments being offset upwardly and outwardly from the high beam filaments HBF. The left turn filament LTFF is situated in the right high beam headlamp 10RC, while the right turn filament RTFF is situated in the left high beam headlamp 10LC. This arrangement is more suitable for a motor vehicle having a relatively long turning radius.

FIG. 1D shows the same high beam headlamps as in FIG. 1A, now designated 10RD and 10LD, but in this case each of said headlamps is provided with two following filaments rather than with only one. Thus right headlamp 10RD is provided with two offset filaments LTFF and RTFF, and so is left headlamp 10LD. Both filaments LTFF may be used for left turn following purposes, or either may be used in that connection. Hence, filament LTFF in right headlamp 10RD may be used for a left turn following beam in connection with a vehicle of long turning radius, while filament LTFF in left headlamp 10LD may be used for the same purpose in a vehicle of short turning radius. Similarly, filament RTFF in right headlamp 10RD may be used for a right turn following beam in a vehicle of short turning radius, whereas filament RTFF in left headlamp 10LD may be used for the same purpose in a vehicle of long turning radius.

As has previously been stated, the headlamps shown in FIG. 1D are identical with each other, and hence are entirely interchangeable for right- or left-hand use. This feature of interchangeability is also possessed by the headlamps shown in FIGS. 1B and 1C, but in a somewhat different sense. Thus, headlamp 10RB in FIG. 1B becomes headlamp 10LC in FIG. 1C, and similarly headlamp 10LB in FIG. 1B becomes headlamp 10RC in FIG. 1C. It is therefore apparent that the headlamps of FIGS. 1B and 1C are interchangeable as between vehicles of long and short turning radius.

Referring now to FIG. 1E, it will be understood that right and left headlamps 10RE and 10LE are provided, respectively, with parabolic reflectors RPR and LPR containing offset filaments RTFF and LTFF. Filaments RTFF and LTFF are displaced from the principal focus, as in FIG. 1B, and for that reason, as well as by reason of the use of specially focused parabolic reflectors RPR and LPR, they effectively project a light beam for following purposes. To further assure an effective beam of light and to compensate for beam aberrations, suitable specialized frontal lenses may be provided opposite reflectors RPR and LPR.

Right and left headlamps 10RF and 10LF, as shown in FIG. 1F, are also provided with offset filaments and parabolic reflectors for turn following purposes. But, unlike the headlamps shown in FIG. 1E, which are intended for vehicles of relatively short turning radius, those shown in FIG. 1F are intended for vehicles of relatively long turning radius. Specifically, offset filament LTFF in headlamp 10RF is positioned for left turn following, while filament RTFF in headlamp 10LF is positioned for right turn following. In short, headlamp 10LF in FIG. 1F is identical with headlamp 10RE in FIG. 1E, and similarly, headlamp 10RF is identical with headlamp 10LE. Hence, it will be observed that FIG. 1F is identical with FIG. 1E, except that the headlamps are in reversed positions.

FIG. 1G depicts a pair of headlamps 10RG and 10LG which are identical in that they are both provided with parabolic reflectors and with a pair of offset filaments LTFF and RTFF respectively. Filament LTFF in headlamp 10RG would be used for left turn following purposes in a vehicle having a long turning radius. Filament RTFF in headlamp 10LG would be used for right turn following purposes in the same kind of vehicle. Conversely, filament RTFF in headlamp 10RG would be used for right turn following purposes in a vehicle of short turning radius, and filament LTFF in headlamp 10LG would be used in the same type of vehicle for left turn following purposes. Here, too, a suitable specialized frontal lens would be provided to compensate for beam aberrations.

It will be understood that an advantage inherent in the headlamps of FIG. 1G resides in their interchangeability, since they are identical. A minor disadvantage resides in the fact that, although two filaments are provided in each headlamp, only one is normally used. However, in mass production the additional expense involved would be far offset by the advantage first above mentioned, of interchangeability. Furthermore, it is quite conceivable that both filaments in each lamp might effectively be used. What is meant is that the left turn following filaments in both headlamps would be used in connection with a left turn, while the two right turn following filaments in said lamps would be used for a right turn.

FIG. 1H discloses a headlamp system which embodies the several features of the present invention in a form fully compatible with and completely complementary to present-day four-headlamp installations. Conventional headlight systems, utilizing a pair of high beam and a pair of low beam headlamps, rely on auxiliary lamps for directional signalling and parking illumination purposes. The system which FIG. 1H discloses combines these auxiliary functions, as well as turn following, in a single pair of headlamps designed for installation with the conventional four-headlamp system above mentioned. The features of FIG. 1H will shortly be described in connection with the circuit diagram which is set forth in FIG. 7.

FIG. 2 shows the electrical connections of the headlamps of FIG. 1B in a complete headlighting system. As the legends in FIG. 2 indicate, and reading from top to bottom, there are provided in said headlighting system a right low beam lamp, a right high beam lamp, a left high beam lamp, and a left low beam lamp. The right and left low beam lamps are conventional, and each contains a low beam filament LBF for use on the low beam, as well as a high beam filament HBF for supplementary use on the high beam. The right high beam lamp 10RB and the left high beam lamp 10LB are identical with those illustrated in FIG. 1B, and each contains a high beam filament HBF, as well as a turning filament. The right high beam lamp 10RB has a hight turn following filmament RTFF, and the left high beam lamp 10 LB has a left turn following filament LTFF, and it will be understood from the relative positions of these lamps as shown in FIG. 2 that this system is intended for use on a motor vehicle having a short turning radius.

When the wheels of the vehicles are deviated the desired amount, either right or left, with the main headlight switch HS closed, and irrespective of the position of foot switch FS, right turn switch RTS or left turn switch LTS, as the case may be, is automatically actuated to energize the appropriate following filament in order to illuminate the turning path of the vehicle. More specifically, when right turn switch RTS is closed, the right turn following filament RTFF in headlamp 10RB will be energized, and similarly, when left turn switch LTS is closed, left turn following filament LTFF in headlamp 10 LB will be energized. The mechanical means for actuating switches RTS and LTS will be described in connection with FIGS. 5, 6A and 6B. The main switch HS and foot switch FS are entirely conventional, it being understood that HS normally performs additional functions such as parking light and tail light control.

Turning now to FIG. 3, it will be observed that a complete headlighting system is provided for a vehicle of relatively long turning radius, the following headlamps being situated on the outside of the desired turn. In this system the headlamps of FIG. 1D are utilized, and a total of four headlamps is provided, being identified from top to bottom as follows: right low beam lamp, right high beam lamp, left high beam lamp, and left low beam lamp. The right and left low beam lamps are conventional, and they contain the usual low beam filaments LBF (used on the low beam) and the usual high beam filaments HBF (used on the high beam). Right high beam lamp 10RD and left high beam lamp 10LD are the same lamps which are shown in FIG. 1D. Lamp 10RD has a conventional high beam filament HBF, a left turn following filament LTFF, and a right turn following filament RTFF. Similarly, left high beam lamp 10LD has a conventional high beam filament HBF, a left turn following filament LTFF, and a right turn following filament RTFF. Main headligtht switch HS and foot switch FS are conventional.

On a left turn, when the wheels of the vehicle are deviated to the desired extent, left turn switch LTS will close and thereby energize filament LTFF in right high beam lamp 10RD. On a right turn, when the wheels are deviated to the desired extent, right turn switch RTS will close to energize filament RTFF in left high beam lamp 10LD. As has above been stated, the mechanism for mechanically actuating switches LTS and RTS will be described in connection with FIGS. 5, 6A and 6B. This is for a vehicle of large turning radius. Transposing the LTFF and RTFF connections at 10RD and 10LD and the positions of RTS and LTS will make the circuit suitable for a vehicle of shorter turning radius.

Referring now to FIG. 4, it will be evident that a circuit diagram is shown which provides for dipping of the high beams on a gentle turn and actuation of the following filaments on a sharper turn. Actually, it is intended that the high beams be dipped on a turn of approximately 25% and that the following filaments be energized on a turn of approximately 50%. The mechanism for achieving this result is, however, not shown in the circuit diagram, but may be seen in FIGS. 5, 6A and 6B.

Specifically, the high beam is dipped to the low beam when the steering wheels are deviated about 25% either left or right from their straight ahead position by the actuation of switch LTS1 or RTS1, as the case may be. A further deviation to about the 50% position actuates either switch LTS2 or switch RTS2. In the former case, both following filaments LTFF are energized, and in the latter case, both following filaments RTFF. This circuit has another feature, namely, that of dimming or extinguishing all driving beams on a very sharp turn, leaving only the following beams for illumination. Thus, further deviation to about the 60% position, will actuate either switch LTS3 or switch RTS3, as the case may be, and all driving beams will thereby be dimmed or completely extinguished, leaving only the following beams to illuminate the path. The 10% differential between actuation of switches LTS2 and RTS2, on the one hand, and switches LTS3 and RTS3, on the other hand, is for the purpose of avoiding an abrupt and disconcerting transition in the quantity of illumination. As the wheels are straightened from their deviated positions, the process is reversed, and when the motor vehicle proceeds once again in a straight line the normal high or low beams, as previously selected by the driver, are again in operation. Should the low beam have been in use prior to the turn, the action is substantially the same, except that actuation of switches LTS1 and RTS1 produce no different effect inasmuch as the low beam bus LBB is already energized.

It will thus be seen that the headlighting system shown in FIG. 4 fully meets the three basic requirements above noted, namely, dipping of the high beam on a gentle curve, additional illumination—that is, turn following illumination—on a sharp curve, and dimming or completely extinguishing unnecessary or undesirable illumination on such sharp curve. If these requirements are met automatically and without any conscious effort on the part of the motorist, this will contribute substantially to driver efficiency, comfort and safety.

Should dimming be preferred to extinguishing, such dimming may be accomplished by the shunting of switch LTS3 with a resistor R1, and the shunting of switch RTS3 with a resistor R2. These are identical, and of such value as to reduce the intensity of any forward driving beams in use prior to the actuation of either LTS3 or RTS3, to any value desired by the designer of the vehicle.

A mechanism for automatically actuating the switches above mentioned is shown in FIGS. 5, 6A and 6B. A typical steering mechanism 50 is shown in FIG. 5 and it will be noted that one of the elements of said steering mechanism is cross shaft 52. To adapt this mechanism to the present invention, all that need be done is to secure to the exposed portion of the threaded end of cross shaft 52 a threaded adapter 60.

The switching mechanism of the present invention includes a casing 64 which is secured by means of brackets 66 and 68 and bolts 70 to the chassis or steering gear box body of the vehicle. Mounted within the casing is a pair of bearings 72 and 74, respectively, which support the actuating shaft 76 of the switch mechanism. It will be noted that the upper end of this shaft projects into a smooth bore 78 formed in the adapter, and it is fixed in place therein by means of set screws 80. This will transfer the rotary motion of the steering gear cross shaft to the switch actuating shaft.

It will now be seen that, affixed to said actuating shaft is a multi-layered cam 82, which engages a plurality of cam followers 84L and 84R, 86L and 86R, and 88L and 88R, respectively. These cam followers may be provided in any conventional form and each may comprise a pivoted switch arm and a roller contact for engagement with the cam. Cam followers 84L and 84R are the switch arms of switches LTS1 and RTS1, respectively. Cam followers 86L and 86R are the switch arms of switches LTS2 and RTS2, respectively. And, finally, cam followers 88L and 88R are the switch arms of switches LTS3 and RTS3, respectively. Switches LTS1, LTS2 and LTS3 may be stacked one above the other and switches RTS1, RTS2 and RTS3 may also be stacked.

It will be understood that cam 82 may comprise a series of cam elements superimposed upon each other and provided, respectively, with three pairs of stepped portions: 84CL and 84CR, 86CL and 86CR, and 88CL and 88CR, respectively. It will of course be understood that cam followers 84L and 84R are positioned for engagement with stepped cam portions 84CL and 84CR, respectively; that cam followers 86L and 86R are positioned for engagement with stepped cam portions 86CL and 86CR, respectively; and that cam followers 88L and 88R are positioned for engagement with stepped cam portions 88CL and 88CR, respectively.

The action of the foregoing cam-actuated switch mechanism will now be described. At about 25% of wheel deviation, stepped cam portion 84CL, or 84CR as the case may be, will engage the corresponding cam follower 84L, 84R, and thereby close the corresponding switch LTS1, RTS1. At about 50% of wheel deviation, stepped cam portion 86CL, or 86CR as the case may be, will engage the corresponding cam follower 86L, 86R, thereby closing the appropriate switch LTS2 or RTS2, as may be the case. And finally, at about 60% of wheel deviation, stepped cam portion 88CL, or 88CR as the case may be, will engage the appropriate cam follower 88L, 88R, and this will actuate the corresponding switch LTS3 or RTS3, as the case may be. The sequence of filament energization resulting from this action has above been described. It will be understood that less elaborate headlighting systems, as illustrated for example in FIGS. 2 and 3, will require fewer cam followers and fewer switches, and hence a simpler cam formation would be appropriate. The individual switches may be operated at different steering deviation angles than those last above set forth, this being purely a matter of preference and design.

The switch casing 64 may be made of drawn sheet steel, for reasons of economy. Weather-proofing may be provided by a tight seal at the point where the shaft enters the switch casing and by means of a gasket 75 between the upper plate of said switch casing and its lower shell. A large rubber grommet 77 may be provided to protect the cable entry hole, aided by a suitable non-hardening sealer.

FIG. 1H presents frontal views of headlamps 10RH and 10LH respectively, and, as has already been indicated, each of these headlamps is provided with a pair of turn following filaments LTFF and RTFF. Filament LTFF in headlamp 10RH may be used in vehicles of relatively long turning radius for left turn following illumination. The corresponding filament LTFF in headlamp 10LH may be used for such illumination in a vehicle of relatively short turning radius. If desired, both filaments may be used for the same purpose simultaneously on either type of vehicle. Filament RTFF in headlamp 10RH may be used for right turn following illumination in vehicles of relatively short turning radius. The corresponding filament RTFF in headlamp 10LH may be used for the same purpose in vehicles of relatively long turning radius. As is the case with the left turn following filaments, both of these right turn following filaments may be used simultaneously in the same vehicle, whether of long or short turning radius. Situated at or near the focal center of headlamp 10RH is a right turn signaling filament RTSF. Similarly, situated in headlamp 10LH is left turn signaling filament LTSF. Above these two signaling filaments are parking lights filaments PLF, one in each lamp.

It will be understood that the headlamps illustrated in FIG. 1H are intended mainly for use in a six-headlamp system as illustrated in FIG. 7. In this system there are two conventional low beam headlamps, one on each side of the vehicle, and two conventional high beam lamps, one on each side of the vehicle. In addition to these headlamps are headlamps 10RH and 10LH, as illustrated in FIG. 1H. The six headlamps may be positioned in any suitable arrangement, as for example in two groups of three on each side. The several switches shown in FIG. 7 function in much the same manner as those shown in FIG. 4.

The foregoing is illustrative of various forms of this invention, from a relatively simple or elementary to a relatively complex or sophisticated form. Each form serves a definite need and performs a definite function. It is, however, the ultimate object of this invention to provide and utilize the sophisticated form illustrated in FIG. 7. Also, FIG. 7 illustrates a refinement not previously herein described, namely the shunting of switches LTS2, RTS2, LTS3 and RTS3 with resistors R3, R4, R5 and R6 respectively. Although they are connected in the identical manner as resistors R1 and R2 in FIG. 4, they are intended to fulfill an entirely different function.

It is well known that frequent switching on and off of tungsten filaments reduces their life. Such deleterious effects can be minimized by energizing such filaments with a fraction of their rated voltage prior to the application of full voltage. Because of the extremely high positive coefficient of resistance with temperature of tungsten, even a small preliminary current bias will greatly reduce the inrush current, and extend the useful life of such filaments, and any associated switches.

What is proposed therefore, is that resistors R3, R4, R5, R6 be of such value as to preheat the filaments of their associated lamps to an infra-red temperature, that is invisible to the human eye, for the purpose of extending the useful life of the components of such a sophisticated headlighting system. Although only four such resistors are shown, the principle may be extended to other portions of the circuit, if desired.

I claim:

In a headlight system for motor vehicles, a pair of headlamps which are entirely free of the normal driving illumination function, each comprising a frontal lens, a parabolic reflector mounted behind said lens, and four filaments supported between said lens and said reflector, one of said filaments being positioned at the focal point of said reflector for turn-signaling illumination, the second and third filaments being positioned in laterally offset relation to said focal point, one on each side thereof, for turn-following illumination, and the fourth filament being positioned below said focal point for parking illumination, means for selectively energizing said filaments, including means for activating either pair of said turn following illumination filaments substantially concurrently with the activation of the corresponding turn signal filament.

References Cited by the Examiner
UNITED STATES PATENTS

| | | | |
|---|---|---|---|
| 1,796,530 | 3/31 | Melish | 313—272 |
| 2,037,863 | 4/36 | Matha | 315—81 |
| 2,611,857 | 9/52 | Coulter | 315—81 |
| 2,675,438 | 4/54 | Pederson | 315—81 |
| 3,023,344 | 2/62 | Owings | 240—8.24 X |
| 3,040,207 | 6/62 | Grantkowski | 240—8.24 X |

GEORGE N. WESTBY, *Primary Examiner.*

ARTHUR GAUSS, *Examiner.*